Jan. 3, 1967   C. DE BUIGNE   3,295,348
EXTRUSION DIE WITH REINFORCED TONGUES
Filed May 12, 1964   2 Sheets-Sheet 1
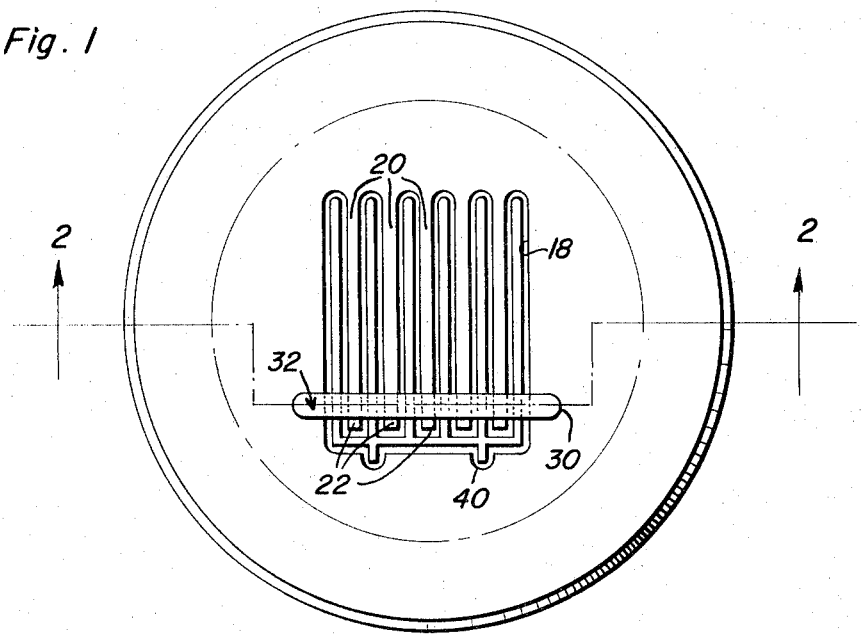
Fig. 1
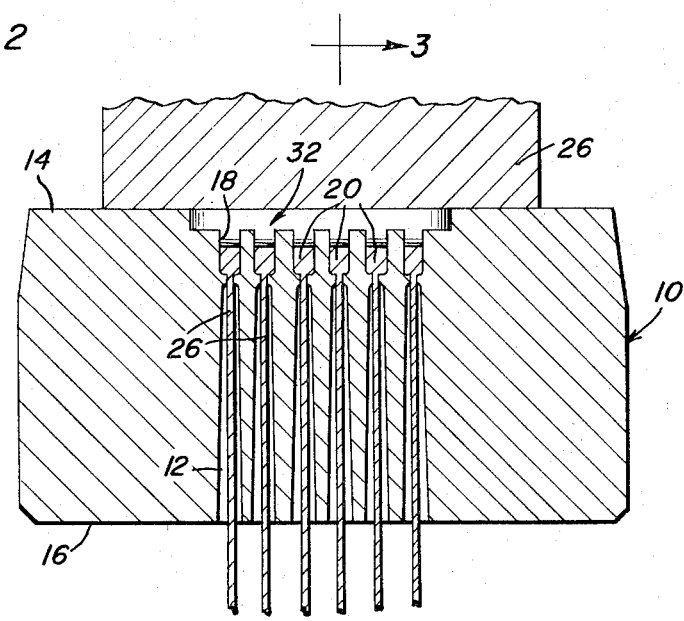
Fig. 2
Fig. 6
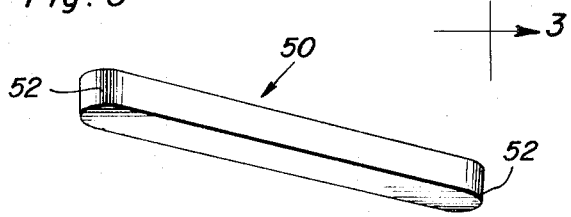
Carl DeBuigne
INVENTOR.

Jan. 3, 1967  C. DE BUIGNE  3,295,348
EXTRUSION DIE WITH REINFORCED TONGUES
Filed May 12, 1964  2 Sheets-Sheet 2

Carl DeBuigne
INVENTOR.

United States Patent Office 3,295,348
Patented Jan. 3, 1967

3,295,348
EXTRUSION DIE WITH REINFORCED TONGUES
Carl De Buigne, 9511 Grinnell, Detroit, Mich. 48213
Filed May 12, 1964, Ser. No. 366,711
10 Claims. (Cl. 72—261)

This invention comprises a novel and useful extrusion die with reinforced tongues and more particularly pertains to a multiple extrusion die specifically adapted for the extruding of a plurality of extrusions which are relatively thin and relatively long in cross-section.

In dies which are specifically designed for the extrusion of a plurality of relatively thin walled sections, the die body is provided with a plurality of tongues disposed in side-by-side relation which are joined at one end to the die body and which have their other ends free of attachment. A problem arises in the use of such dies when relatively dense material such as metal is to be extruded by the die. Owing to the pressures and forces involved, as well as the temperatures, there is a tendency for the free ends of the die extrusion tongues to be laterally displaced or to be distorted or deformed. This, of course, interferes with the dimensional accuracy of the extrusions.

It is therefore the primary purpose of this invention to provide a multiple tongue extrusion die specifically adapted for the extrusion of relatively thin walled sections which shall provide a novel and highly effective support means for the free ends of the extrusion tongues.

A further object of the invention is to provide a die in accordance with the foregoing objects wherein the support and reinforcing means for the free ends of the tongues will afford a minimum resistance to flow through the die of the material of the billet being extruded thereby.

A still further object of the invention is to provide a die construction in accordance with the foregoing objects wherein the supporting means shall include lateral support and brace surfaces engaging the sides of adjacent extrusion tongues.

Yet another object of the invention is to provide an extrusion die construction in accordance with the preceding objects which shall include cooperating recesses on the single reinforcing bar and the die tongues whereby the surfaces of the die, the tongues and the bar shall be coplanar.

A still further purpose of the invention is to provide a reinforced tongue extrusion die in accordance with the preceding objects wherein the entire tongue and reinforcing structure shall be conveniently and compactly disposed in the feed chamber and throat of the die without protruding from the normal exterior surface of the die in any manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view showing a mulitple tongue extrusion die in accordance with this invention and showing the reinforcing bar extending transversely across and secured to the free ends of the tongues;

FIGURE 2 is a view in vertical transverse section taken substantially upon the plane indicated by the broken section line 2—2 of FIGURE 1;

FIGURE 6 is a perspective view of the modified reinforcing bar employed in the construction of FIGURE 5.

Figure 3:
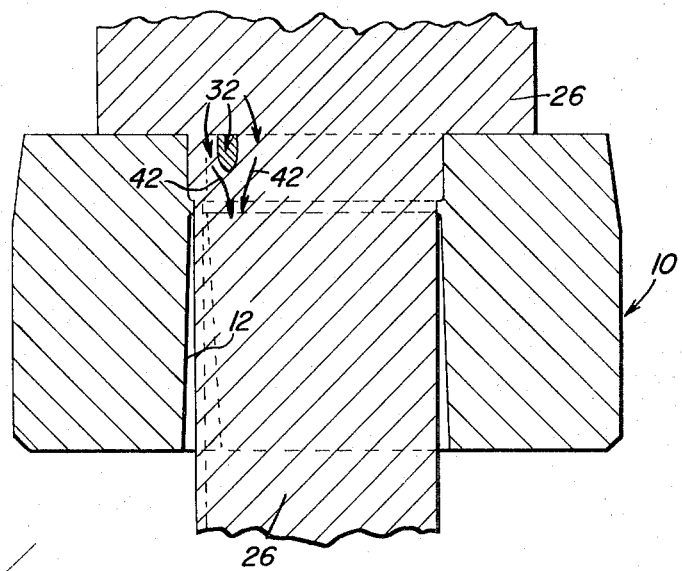
FIGURE 3 is a detail view taken upon an enlarged scale in vertical longitudinal section substantially upon the plane indicated by the section line 3—3 of FIGURE 2.

Referring first to FIGURES 2 and 3 it will be observed that the numeral 10 designates a die body of any conventional design but which is of the multiple tongue type. The die body has an extrusion opening 12 extending therethrough from the inlet face 14 of the die through the discharge face 16 thereof. The die body may be mounted upon the usual die backer member, not shown.

The extrusion passage through the die includes the usual feed chamber 18 upon the inlet side of the die body and from the feed chamber the extrusion opening has a throat portion in which are disposed a plurality of extrusion tongues 20. The extrusion tongues, as shown in FIGURE 1, are joined at one end to the material of the die body 10 so as to be integral therewith. The other ends of the tongues, indicated by the numeral 22 are free or spaced from each other and project across the feed chamber 18, being integral with one side of the feed chamber and terminating in spaced relation with the other side thereof as will be apparent from FIGURE 1. Between the extrusion tongues thereof there are thus formed relatively narrow extrusion passages as at 24 through which the material of the billet 26 being extruded flows during the passage of the billet through the die to form the thin walled extrusions 26. It will be noted that the lower ends of the extrusion tongues are downwardly convergent so as to provide extrusion passages of tapering downwardly increasing width to reduce the resistance to the flow of the extruded material through the die.

Figure 4:
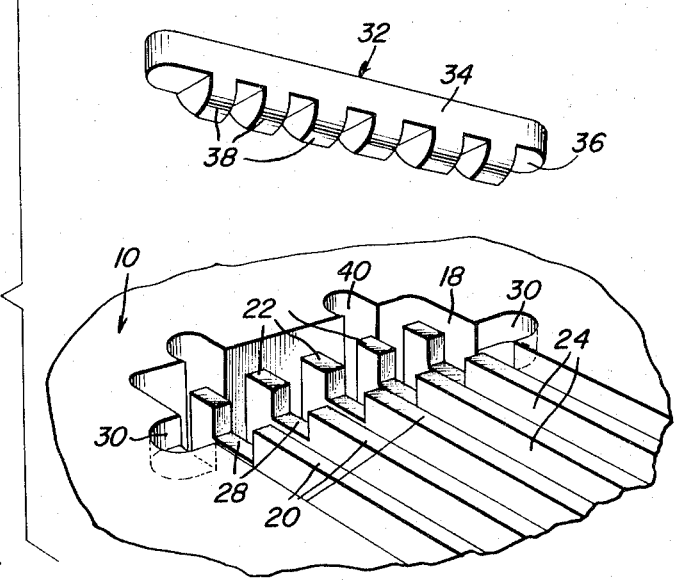
FIGURE 4 is an exploded perspective view of a portion of the die body, the multiple extrusion tongues therein and the reinforcing bar for the multiple tongues in accordance with this invention.

In accordance with this invention, a simple means is provided for effectively reinforcing the free ends 22 of the extrusion tongues. For this purpose, as shown best in FIGURE 4, it will be observed that the top surfaces of the tongues are provided with pockets or notches 28 therein. Further, the sides of the feed chamber are provided with laterally projecting recesses as at 30 which are in transverse alignment with a series of notches or pocket 28. A single reinforcing bar indicated generally by the numeral 32 is provided. This bar comprises an elongated symmetrical body 34 having rounded extremities 36 which are adapted to fit into the pockets 30. Depending from the underside of the reinforcing body 34 are a series of spacing keys 38. As will be observed from FIGURE 4, these keys are downwardly tapering and convergent. The keys are of sufficient width and are spaced from each other a sufficient distance so that they may be snugly engaged between adjacent surfaces of adjacent extrusion tongues when the body 34 is seated in the pockets 30 and rests in the pockets or notches 28 of the tongues. It may thus be considered that the bar 34 provides by the spaces between the keys complementary corresponding recesses or notches cooperating with the extrusion tongue notches 28 to establish a sturdy close fitting snug interengagement between the tongues and the reinforcing bar.

The arrangement is such that the top surface of the body 10, the extrusion tongues 20 and of the reinforcing bar 32 are all coplanar as will be readily apparent from FIGURE 2.

Referring again to FIGURE 4 it will be seen that the feed pocket 18 is also provided with additional vertically extending passages or notches 40 opening thereinto from the top surface 14 thereof. These pockets facilitate the flow of the material of the billet 26 into the feed pocket of the die and from thence through the die passage.

By virtue of the tapering, rounded or conoidal lower surfaces of the spacer keys 38, the material of the billet will flow thereabout when a streamlined flow is indicated by the arrows at 42 in FIGURE 3. Thus, a non-resistance to flow of the billet material through the die is effected by the extrusion tongue reinforcement of this invention.

Figure 5:
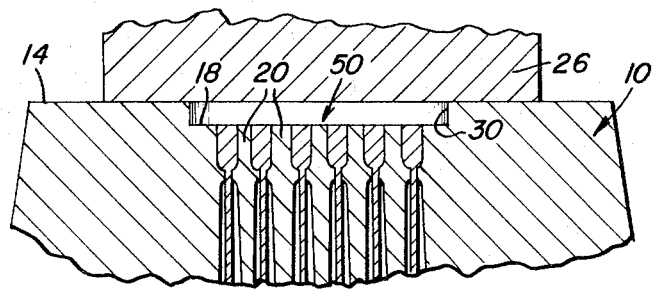
FIGURE 5 is a view similar to FIGURE 2 but showing a modified construction.

A somewhat simpler construction is shown in FIGURES 5 and 6. In this construction the same structural features of the die body and extrusion tongues and feed chamber are provided as in the preceding arrangement. However, in this form an extrusion tongue reinforcing bar indicated generally by the numeral 50 is provided which is of a regular shape having rounded extremities 52 at its ends. These ends fit into the pockets 30 previously mentioned with regard to the feed chamber 18 and the same operation is performed by the die except that in this instance the spacer keys 38 of the preceding form of the invention are omitted.

In both arrangements it will be appreciated that the reinforcing bar 32 or 50 is fixedly secured to the die body 10 as by welding the ends thereof where they are received in the pockets 30. In addition, the reinforcing bar is welded to the adjacent surfaces of each of the extrusion tongues to thus rigidly engage and reinforce and stiffen the latter against movement or distortion.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A multiple tongue extrusion die comprising a body having a die passage therethrough including a throat and a feed pocket at the inlet end of the latter together with a plurality of extrusion tongues projecting into said feed pocket and each having one end secured to said body and having its other end free, said tongues providing narrow extrusion passages therebetween for forming relatively thin and long extrusions, a reinforcing bar in said feed pocket having its end fixedly secured to said die body and extending transversely across said tongues adjacent the free ends thereof and fixedly secured to each tongue.

2. The combination of claim 1 wherein said bar and said die body have coplanar surfaces on the inlet side of said die.

3. The combination of claim 1 wherein said bar and said tongues have cooperating engaging recesses.

4. The combination of claim 1 wherein said bar has spacing keys projecting therefrom and disposed between and engaging and spacing adjacent tongues.

5. The combination of claim 2 wherein said bar and said tongues have cooperating engaging recesses.

6. The combination of claim 5 wherein said bar has spacing keys projecting therefrom and disposed between and engaging and spacing adjacent tongues.

7. The combination of claim 6 wherein the underside of said spacing keys are taperingly convergent away from said bar whereby to provide a streamline flow of the extrusion material past said bar and into said extrusion passages.

8. The combination of claim 3 wherein said bar has spacing keys projecting therefrom and disposed between and engaging and spacing adjacent tongues.

9. The combination of claim 8 wherein the underside of said spacing keys are taperingly convergent away from said bar whereby to provide a streamline flow of the extrusion material past said bar and into said extrusion passages.

10. The combination of claim 4 wherein the underside of said spacing keys are taperingly convergent away from said bar whereby to provide a streamline flow of the extrusion material past said bar and into said extrusion passages.

References Cited by the Examiner
UNITED STATES PATENTS 2,867,321  1/1959  Swanson _____ 72—272
3,150,773  9/1964  Richter _____ 72—261

CHARLES W. LANHAM, *Primary Examiner.*

H. D. HOINKES, *Assistant Examiner.*